US 9,141,549 B2

(12) United States Patent
Yano et al.

(10) Patent No.: US 9,141,549 B2
(45) Date of Patent: Sep. 22, 2015

(54) MEMORY SYSTEM WITH READ AND WRITE CACHES AND METHOD OF CONTROLLING MEMORY SYSTEM WITH READ AND WRITE CACHES

(75) Inventors: Hirokuni Yano, Tokyo (JP); Naoki Otsuka, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 996 days.

(21) Appl. No.: 12/542,222

(22) Filed: Aug. 17, 2009

(65) Prior Publication Data

US 2010/0169549 A1 Jul. 1, 2010

(30) Foreign Application Priority Data

Dec. 27, 2008 (JP) ................................. 2008-335504

(51) Int. Cl.
*G06F 12/08* (2006.01)

(52) U.S. Cl.
CPC ........ *G06F 12/0862* (2013.01); *G06F 12/0868* (2013.01); *G06F 2212/214* (2013.01); *G06F 2212/222* (2013.01); *G06F 2212/6028* (2013.01)

(58) Field of Classification Search
CPC ................................................. G06F 2212/282
See application file for complete search history.

(56) References Cited

U.S. PATENT DOCUMENTS

| | | | | |
|---|---|---|---|---|
| 5,163,142 A * | 11/1992 | Mageau | ................ | 711/142 |
| 5,774,682 A * | 6/1998 | Benhase et al. | ................ | 711/118 |
| 5,966,726 A * | 10/1999 | Sokolov | ................ | 711/113 |
| 6,112,297 A * | 8/2000 | Ray et al. | ................ | 712/225 |
| 6,321,298 B1 * | 11/2001 | Hubis | ................ | 711/124 |
| 7,437,537 B2 * | 10/2008 | Bridges et al. | ................ | 712/204 |
| 2004/0205298 A1 * | 10/2004 | Bearden et al. | ................ | 711/137 |
| 2005/0071551 A1 * | 3/2005 | Miyamoto | ................ | 711/113 |
| 2005/0195635 A1 * | 9/2005 | Conley et al. | ................ | 365/149 |
| 2005/0223165 A1 | 10/2005 | Schmidt et al. | | |
| 2007/0016719 A1 | 1/2007 | Ono et al. | | |
| 2007/0214325 A1 | 9/2007 | Sasamoto | | |
| 2008/0046660 A1 | 2/2008 | Takai et al. | | |

(Continued)

FOREIGN PATENT DOCUMENTS

| | | |
|---|---|---|
| JP | 6-309233 A | 11/1994 |
| JP | 2000-122929 | 4/2000 |
| JP | 2000-222137 A | 8/2000 |

(Continued)

OTHER PUBLICATIONS

Jalena Trajkovic et al. "Improving SDRAM Access Energy Efficiency for Low-Power Embedded Systems." Apr. 2008. ACM. ACM Transactions on Embedded Computing Systems. vol. 7. No. 3.*

(Continued)

*Primary Examiner* — Nathan Sadler
(74) *Attorney, Agent, or Firm* — Oblon, McClelland, Maier & Neustadt, L.L.P.

(57) ABSTRACT

A controller sets, out of a data range that is specified in a read request from a host device, a predetermined size of a first data range that follows a top portion of the data range and a predetermined size of a second data range that follows the first data range, and after transfer, to the host device, of data corresponding to the first data range from a second storage unit or a third storage unit having smaller data output latency than the first storage unit in which read/write of data is performed is started, the controller searches for data corresponding to the second data range in the second storage unit or the third storage unit.

20 Claims, 3 Drawing Sheets

(56) References Cited

U.S. PATENT DOCUMENTS

| | | |
|---|---|---|
| 2009/0037664 A1* | 2/2009 | Kornegay et al. ............. 711/138 |
| 2009/0157980 A1* | 6/2009 | Bruce ........................... 711/141 |

FOREIGN PATENT DOCUMENTS

| | | |
|---|---|---|
| JP | 2007-241927 | 9/2007 |
| WO | WO 2009/084286 A1 | 7/2009 |
| WO | WO 2009/084724 A1 | 7/2009 |
| WO | WO 2009/130809 A1 | 10/2009 |

OTHER PUBLICATIONS

Arie Tal. "Two Flash Technologies Compared: NOR vs NAND." Oct. 2002. M-Systems. Rev. 1.*

IEEE. IEEE 100: The Authoritative Dictionary of IEEE Standards Terms. Dec. 2000. IEEE. 7$^{th}$ ed. p. 917.*

U.S. Appl. No. 12/551,213, filed Aug. 31, 2009, Kanno, et al.
U.S. Appl. No. 12/529,126, filed Aug. 28, 2009, Yano, et al.
U.S. Appl. No. 12/529,282, filed Aug. 31, 2009, Hida, et al.
U.S. Appl. No. 12/552,330, filed Sep. 2, 2009, Yano, et al.
U.S. Appl. No. 12/552,422, filed Sep. 2, 2009, Kitsunai, et al.
U.S. Appl. No. 12/555,274, filed Sep. 8, 2009, Kanno, et al.
U.S. Appl. No. 12/884,844, filed Sep. 17, 2010, Yano, et al.
U.S. Appl. No. 13/052,146, filed Mar. 21, 2011, Ootsuka, et al.
U.S. Appl. No. 13/237,396, filed Sep. 20, 2011, Morita.
U.S. Appl. No. 13/238,675, filed Sep. 21, 2011, Norimatsu, et al.
U.S. Appl. No. 13/326,872, filed Dec. 15, 2011, Hirao, et al.
U.S. Appl. No. 13/326,929, filed Dec. 15, 2011, Hida, et al.
U.S. Appl. No. 13/328,471, filed Dec. 16, 2011, Yano, et al.
Japanese Office Action Issued Nov. 6, 2012 in Patent Application No. 2008-335504 (with English translation).
U.S. Appl. No. 13/599,087, filed Aug. 30, 2012, Yonezawa, et al.
U.S. Appl. No. 13/609,991, filed Sep. 11, 2012, Hirao, et al.
U.S. Appl. No. 13/613,379, filed Sep. 13, 2012, Morita.

* cited by examiner

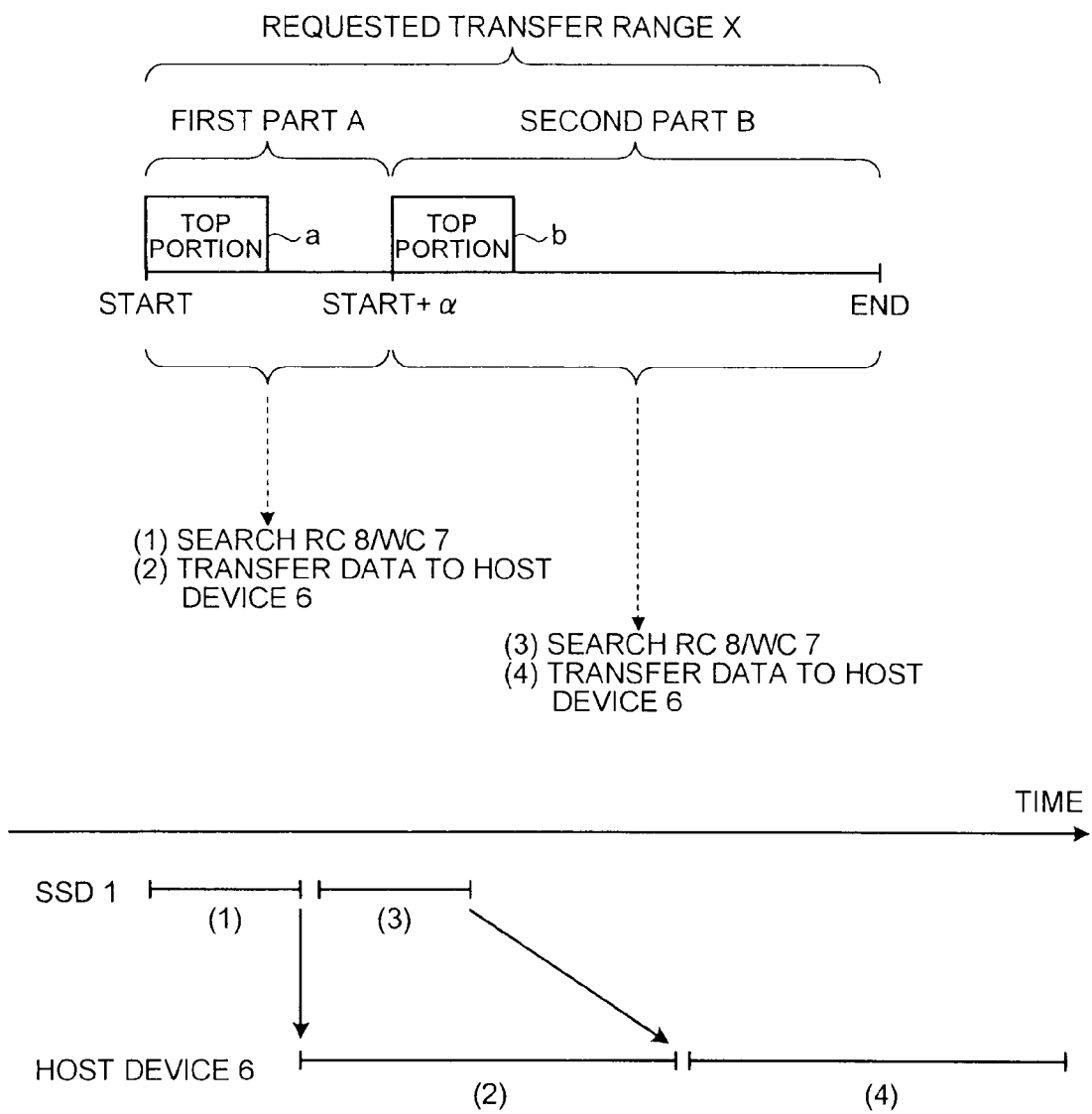

MEMORY SYSTEM WITH READ AND WRITE CACHES AND METHOD OF CONTROLLING MEMORY SYSTEM WITH READ AND WRITE CACHES

CROSS-REFERENCE TO RELATED APPLICATIONS

This application is based upon and claims the benefit of priority from the prior Japanese Patent Application No. 2008-335504, filed on Dec. 27, 2008; the entire contents of which are incorporated herein by reference.

BACKGROUND OF THE INVENTION

1. Field of the Invention

The present invention relates to a memory system having a nonvolatile semiconductor memory and a controller.

2. Description of the Related Art

Data storage apparatuses (memory systems) include a data storage medium, a host device, and a control device that performs transmission and reception of data between the host device and the data storage medium. In such a data storage apparatus, by providing a cache memory (a read cache function) that can be accessed quicker than the data storage medium, access performance from the host device is enhanced.

In a data storage apparatus having a cache memory, by using a prefetch function for data in the data storage medium when a sequential read request is received from the host device, the access performance is enhanced.

The prefetch function for data is a function of reading data in a sequential area (a subsequent area) from the data storage medium into the cache memory in advance when a read request issued from the host device has sequentiality. The sequentiality represents that a read request with respect to a subsequent data area is to be issued in sequence. When a read request having sequentiality is issued from the host device and the prefetch of data is to be performed, data in the sequential subsequent area for which a read request is expected to be issued is read from the data storage medium into the cache memory in advance prior to reception of a read request therefor from the host device.

A data storage medium described in Japanese Patent Laid-open No. 2007-241927 determines that a read request has sequentiality when the transfer size of a read request from a host computer is equal to a prefetch determination size set in advance, and prefetches, while transmitting data requested by the read request to the host computer, data in a subsequent storage area that continues from the data corresponding to the read request from a storage device to a cache memory.

However, in the technique disclosed in Japanese Patent Laid-open No. 2007-241927, there is a problem that it takes a long time to read data by the host device as a result of late start of data transfer to the host device, because it takes a long time for a search process to determine whether requested data is stored in the cache memory. Such a problem also occurs in a solid state drive (SSD) on which a nonvolatile semiconductor memory such as a NAND flash memory is mounted. Specifically, in an SSD that is configured to read data at a high speed from a flash memory by providing a cache memory between the flash memory and a host device, it takes a long time for a searching process to determine whether data for which a data request has been issued by the host device is stored in the cache memory, and therefore, it takes a long time for the host device to read data.

BRIEF SUMMARY OF THE INVENTION

A memory system according to an embodiment of the present invention comprises: a first storage unit that is constituted by a nonvolatile semiconductor storage device in which reading and writing of data is performed; a second storage unit that is constituted by a semiconductor storage device having smaller data output latency than the nonvolatile semiconductor storage device; a third storage unit that is constituted by a semiconductor storage device having smaller data output latency than the nonvolatile semiconductor storage device; and a controller that writes data for which a write request has been issued by a host device in the first storage unit through the second storage unit, and that transfers data for which a read request has been issued to the host device by reading from any one of the second storage unit and the third storage unit, or by reading from the first storage unit through the third storage unit, wherein the controller sets, out of a data range that is specified in a read request from the host device, a predetermined size of a data range that follows a top portion of the data range as a first data range, sets a predetermined size of a data range that follows the first data range as a second data range, and searches for data corresponding to the second data range in any one of the second storage unit and the third storage unit after transfer of data corresponding to the first data range from any one of the second storage unit and the third storage unit to the host device is started.

A controller according to an embodiment of the present invention comprises: a control unit that controls a first storage unit that is constituted by a nonvolatile semiconductor storage device in which reading and writing of data is performed, a second storage unit that is constituted by a semiconductor storage device having smaller data output latency than the nonvolatile semiconductor storage device, a third storage unit that is constituted by a semiconductor storage device having smaller data output latency than the nonvolatile semiconductor storage device, wherein the control unit writes data for which a write request has been issued by a host device in the first storage device through the second storage unit, and transfers data for which a read request has been issued to the host device by reading from any one of the second storage unit and the third storage unit, or by reading from the first storage unit through the third storage unit, and sets, out of a data range that is specified in a read request from the host device, a predetermined size of a data range that follows a top portion of the data range as a first data range, sets a predetermined size of a data range that follows the first data range as a second data range, and searches for data corresponding to the second data range in any one of the second storage unit and the third storage unit after transfer of data corresponding to the first data range from any one of the second storage unit and the third storage unit to the host device is started.

BRIEF DESCRIPTION OF THE DRAWINGS

FIG. 3 is a schematic diagram for explaining the operation of the SSD.

DETAILED DESCRIPTION OF THE INVENTION

Figure 1:
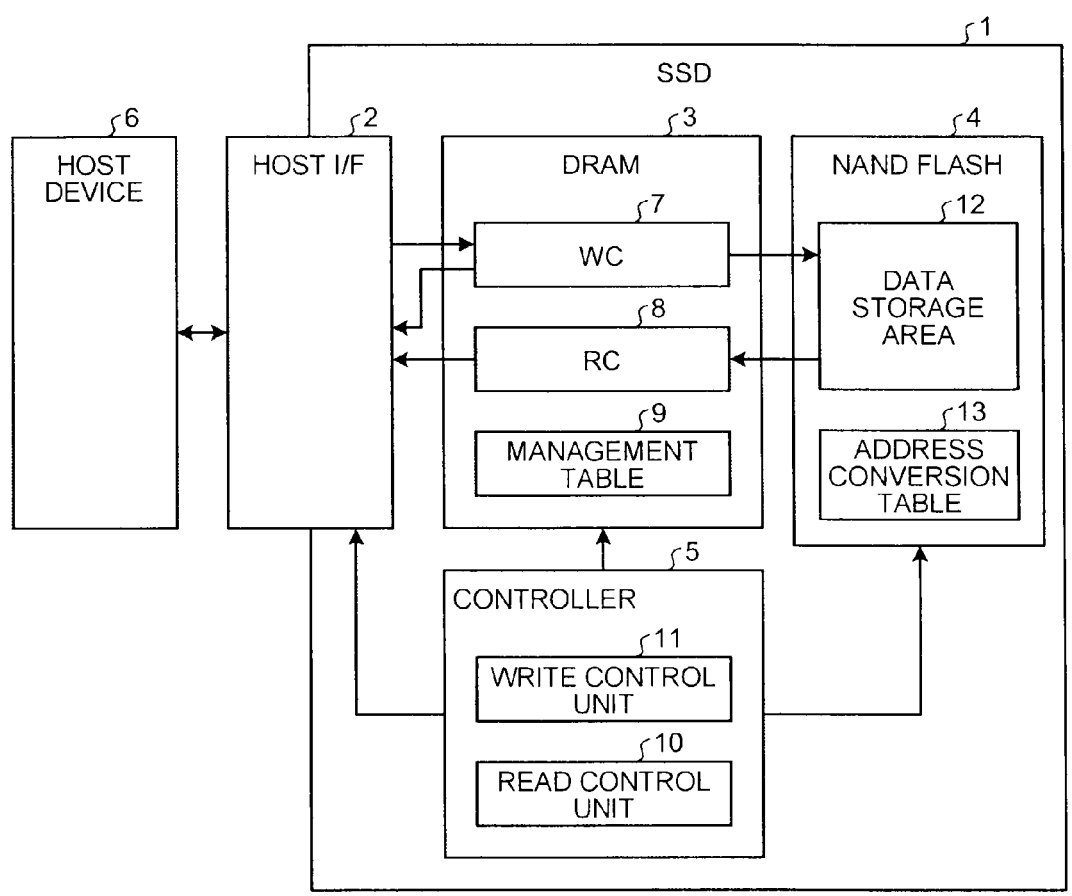
FIG. 1 is a block diagram of a configuration example of an SSD according to an embodiment of the present invention.

Exemplary embodiments of a memory system and a controller according to the present invention will be explained below in detail with reference to the accompanying drawings.

The present invention is not limited to the following embodiments. In the following descriptions, constituent elements having the same function or configuration are denoted by like reference numerals and explanations thereof will be omitted.

FIG. 1 is a block diagram of a configuration example of an SSD according to an embodiment of the present invention. An SSD 1 is a semiconductor storage device (a memory system) that is connected to a host device 6 such as a personal computer and a central processing unit (CPU) core, and that functions as an external memory of the host device 6.

The SSD 1 includes a host interface (I/F) 2 that is an interface for memory connection, a dynamic random access memory (DRAM) 3 serving as a volatile semiconductor memory, a NAND flash (a NAND memory) 4 serving as a nonvolatile semiconductor memory, and a controller (a drive control circuit) 5. The SSD 1 is connected to the host device 6 through the host I/F 2, and performs data communication with the host device 6. The host device 6 writes data in the SSD 1 and reads data from the SSD 1.

The NAND flash is constituted by a plurality of stacked NAND memory chips (for example, 1 chip=2 GB). The NAND flash (a first storage unit) 4 stores, in a data storage area 12, data that is temporarily stored in the DRAM 3 and provided by the host device 6. The data storage area 12 has a plurality of blocks that are the smallest units for deleting data in the NAND flash 4. The NAND flash 4 stores an address conversion table 13 (a management table 9) described later together with the data provided by the host device 6.

The DRAM 3 functions as a cache for data transfer between the host device 6 and the NAND flash 4 and a memory for a work area. A storage area of the DRAM 3 is divided into a write cache (WC) 7 and a read cache (RC) 8. Furthermore, the DRAM 3 stores the management table 9 in the work area. The WC (a second storage unit) 7 temporarily stores data written by the host device 6 and the RC (a third storage unit) 8 temporarily stores data read from the NAND flash 4. The WC 7 and the RC 8 can use a storage area in an identical memory chip in common, or can be constituted by separate memory chips. The WC 7 is constituted by a volatile semiconductor storage device to which data is written at a higher speed than to the NAND flash 4, and the RC 8 is constituted by a volatile semiconductor storage device from which data is read at a higher speed than from the NAND flash 4.

The DRAM 3 temporarily stores the address conversion table 13 that is read from the NAND flash 4 as the management table 9 when the SSD 1 is active. The address conversion table 13 is read from the NAND flash 4 to the DRAM 3 at the time of the initialization of the SSD 1 to be used.

The address conversion table 13 is an information table that indicates association between a logical address and a physical address of data to be written/read with respect to the SSD 1, and is used when conversion between a logical address and a physical address is performed. The logical address is a logical address that is assigned by the host device 6 when the host device 6 writes/reads data to and from the SSD 1, and is input from the host device 6 to the SSD 1 as logical block addressing (LBA).

The address conversion table 13 is present only in the NAND flash 4 when an operation of the SSD 1 is stopped, while the address conversion table 13 is read to the DRAM 3 as the management table 9 to be used. When writing/reading of data with respect to the SSD 1 is instructed by the host device 6, contents of the management table 9 on the DRAM 3 is updated. The management table 9 is written in the NAND flash 4 at a predetermined timing, to avoid loss of the contents due to power cut or the like.

The controller 5 controls transfer of data between the host device 6 and the NAND flash 4 through the DRAM 3, and controls the respective components of the SSD 1. The controller 5 includes a CPU (not shown), and controls the SSD 1 by commands executed by the CPU. The CPU of the controller 5 includes a write control unit 11 and a read control unit 10. In practice, a computer program (a write/read control program) executed by the CPU is a module including the write control unit 11 and the read control unit 10. The write/read control program is read from a ROM (not shown) or the like and executed by the CPU, thereby implementing the write control unit 11 and the read control unit 10 in the CPU.

The write control unit 11 controls writing of data to the WC 7 from the host device 6 and writing of data to the NAND flash 4 from the WC 7 according to a request from the host device 6. When writing of data to the NAND flash 4 from the WC 7 is performed, data in the RC 8 at an identical logical address is nullified. The read control unit 10 controls reading of data from the NAND flash 4 to the RC 8 and data transfer from the RC 8 or the WC 7 to the host device 6 according to a request from the host device 6. The data in the RC 8 is one read from the NAND flash 4 and temporarily stored therein. When data is written at the same logical address as that of the data in the RC 8 from the host, the written data is the latest data, and is stored in the WC 7. Accordingly, when data corresponding to the identical logical address is present in the WC 7, the RC 8, and the NAND flash 4, the order of newness of the data is as the WC 7, the RC 8, and the NAND flash 4, and therefore, the data in the WC 7 takes precedence for data to be returned to the host.

The controller 5 converts a logical address of data provided by the host device 6 into a physical address at which the data is actually stored in the NAND flash 4. Specifically, the controller 5 records, when data provided by the host device 6 is stored in the NAND flash 4, the external address of the data and the physical address of the data at which the data is stored in the NAND flash 4 in association in the management table 9 (the address conversion table 13). Upon reception of a read request from the host device 6, the controller 5 converts the logical address in the read request into the physical address that corresponds to the logical address, using the management table 9. Specifically, the address conversion is performed by converting an upper portion (several bits) of the logical address (LBA) provided by the host device 6 into a page position in blocks in the NAND flash 4, and converting the remaining lower portion (several bits) into a data position in a page.

The controller 5 updates addresses in the address conversion table 13 that is temporarily stored in the DRAM 3 corresponding to reading/writing of data with respect to the NAND flash 4. The update of the address conversion table 13 in the NAND flash 4 is performed at an arbitrary timing such as when the SSD 1 stops the operation.

Although in the example shown in FIG. 1, the DRAM 3 is used as the cache for data transfer, another memory having less latency than the NAND flash 4 can be used instead of the DRAM 3. For example, instead of the NAND flash 4, a ferroelectric RAM (FeRAM) can be used. The cache for data transfer is not necessarily required to be constituted by a volatile semiconductor memory, and can be constituted by a nonvolatile semiconductor memory. If the cache for data transfer is constituted by a nonvolatile semiconductor memory, the address conversion table 13 is not necessarily required to be stored in the NAND flash 4.

Figure 2:
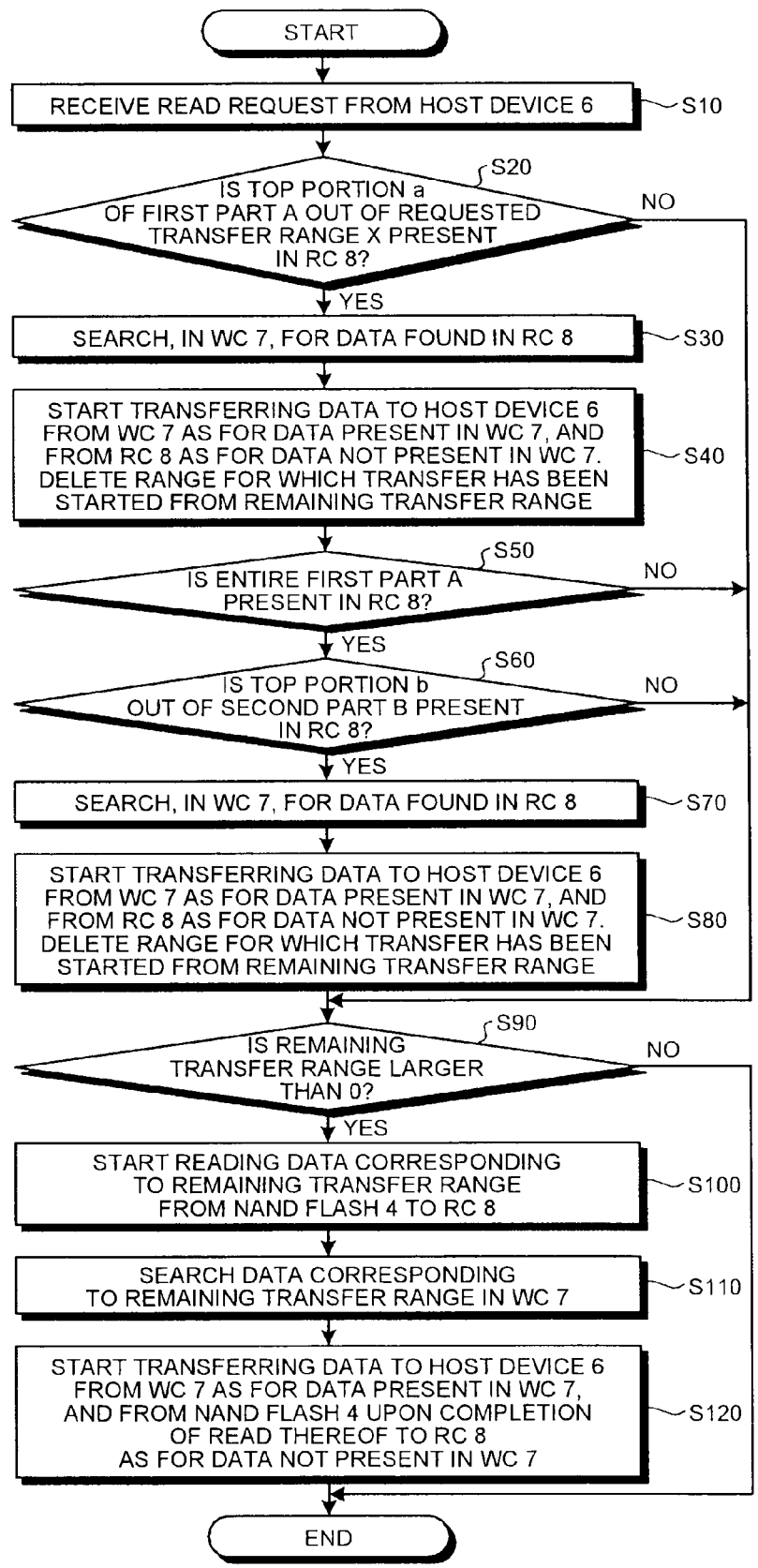
FIG. 2 is a flowchart of an operation of the SSD according to the embodiment.

Next, an operation of the SSD according to the embodiment is explained. FIG. 2 is a flowchart of the operation of the SSD according to the embodiment. FIG. 3 is a schematic diagram for explaining the operation of the SSD. Procedures of a data search process, a data read process from the NAND flash 4, and a data transfer process to the host device 6 are explained below.

When a data read request is sent to the SSD 1 from the host device 6, the SSD 1 receives this read request through the host I/F 2 (Step S10). The read request sent from the host device 6 includes a requested transfer range X of data. The requested transfer range X indicates a range of data that is requested to be read by a start logical address of data requested to be read (read request data) and a transfer size, for example.

In the requested transfer range X, the read control unit 10 of the controller 5 checks whether a predetermined size of data at top is present in the RC 8 in sequence from the top, referring to the management table 9. The requested transfer range X is a range of data for which the read request is issued, and can be divided into a first part A (data range having a size α) that is a first data range, and a second part B that is a second data range. The first part A indicates a data range of the first part in the requested transfer range X, and the second part B indicates a data range of the second part following the first part A. In the present embodiment, the read control unit 10 divides a range of data requested to be read by the host device 6 into a first part and a second part having a predetermined size. In other words, the read control unit 10 sets the first part in a predetermined size and the second part in a predetermined size in the range of data requested to be read by the host device 6. Out of the first part A, a top portion a is the first area of the data range indicated by the requested transfer range X, and out of the second part B, a top portion b is the first data area in the second part B. The read control unit 10 searches for sequential data from the top portion a in the first part A out of the requested transfer range X in the RC 8 (Step S20). When it is present in the RC 8, the size of the top portion a is the size of the sequential data from the top of the first part A found in the RC 8.

When the data of the top portion a is present in the RC 8 (YES at Step S20), the read control unit 10 searches for the data present in the RC 8 in the WC 7 (Step S30). The search in the WC 7 is a process required to transfer the latest data written by the host device 6 as data requested to be read. The read control unit 10 starts transferring data that is present in the WC 7 from the WC 7, data not present in the WC 7 from the RC 8, to the host device 6. Furthermore, the read control unit 10 deletes a data range for which transfer to the host device 6 has been started, that is the size of the top portion a, from the remaining transfer range (Step S40). The remaining transfer range is a data range for which transfer to the host device 6 has not been started out of the requested transfer range X.

The size of the data that is found in the RC 8 as the top portion a and the size of the first part A are compared to determine whether the sizes are equal to each other. In other words, the read control unit 10 determines whether the entire part of the first part A (entire data range) is present in the RC 8 referring to the management table 9 (Step S50). When the entire part of the first part A is present in the RC 8 (YES at Step S50), the read control unit 10 transfers the data from the WC 7 as for the data present in the WC 7, and from the RC 8 as for the data not present in the WC 7, to the host device 6. The read control unit 10 then deletes a data range for which transfer to the host device 6 has been started from the remaining transfer range. Thus, the remaining transfer range corresponds to a data range of the second part B. The processes at Steps S20 and S30 correspond to a process of (1) in FIG. 3, and the process at Step S40 corresponds to a process of (2) in FIG. 3.

After data transfer of the first part A to the host device 6 is started, the read control unit 10 searches for sequential data from the top portion b in the RC 8 out of the second part B, which is the remaining transfer range, referring to the management table 9 (Step S60). When the data of the top portion b is present in the RC 8 (YES at Step S60), the size of the top portion b corresponds to the size of the sequential data from the top of the second part B found in the RC 8, and the read control unit 10 searches the data of the top portion b present in the RC 8 in the WC 7 (Step S70). The read control unit 10 starts transferring the data to the host device 6 from the WC 7 as for the data present in the WC 7, and from the RC 8 as for the data not present in the WC 7. Moreover, the read control unit 10 deletes a data range for which transfer to the host device 6 has been started, that is the size of the top portion b, from the remaining transfer range (Step S80). The processes at Steps S60 and S70 correspond to a process of (3) in FIG. 3, and the process at Step S80 corresponds to a process of (4) in FIG. 3.

The read control unit 10 determines whether the remaining transfer range is larger than 0 (Step S90). In other words, the read control unit 10 determines whether data that is not present in the RC 8 is present out of data specified by the requested transfer range X, referring to the management table 9. Thus, the read control unit 10 determines whether data that has not been found in the RC 8 is present.

When the remaining transfer range is larger than 0 (YES at Step S90), the read control unit 10 starts reading data corresponding to the remaining transfer range from the NAND flash 4 to the RC 8 (Step S100). Thereafter, the read control unit 10 searches the data corresponding to the remaining transfer range in the WC 7 (Step S110). The read control unit 10 starts transferring the data to the host device 6 from the WC 7 as for the data present in the WC 7, and from the NAND flash 4 as for the data not present in the WC 7, upon reading the data therefrom to the RC 8 (Step S120). Subsequently, all the data corresponding to the remaining transfer range is transferred to the host device 6 from the WC 7 or the NAND flash 4 (the RC 8), and the data transfer process is ended. When the remaining transfer range is 0 (NO at Step S90), the read control unit 10 ends the data transfer process.

Furthermore, when the data of the top portion a is not present in the RC 8 at Step S20 (NO at Step S20), when the entire part of the first part A is not present in the RC 8 at Step S50 (NO at Step S50), and when the data of the top portion b is not present in the RC 8 at Step S60 (NO at Step S60), the read control unit 10 performs a process of reading data from the NAND flash 4 (Steps S90 to S120).

As described above, in the present embodiment, after data search and data transfer of the first part A are started, the data search process for the second part B is started. This enables to make the first response to the host device 6 quickly. Furthermore, because data transfer to the host device 6 has already been started at the time of starting data search for the second part B, a processing time required for following data search can be inconspicuous.

Furthermore, in the present embodiment, when data reading from the NAND flash 4 is executed for the remaining range, the process of reading data from the NAND flash 4 to the RC 8 is started before performing the process of searching data in the WC 7. This is because it is important to start reading from the NAND flash 4 as early as possible since data is rarely read from the WC 7 and the NAND flash 4 has large latency in data output. Once reading from the NAND flash 4 is started, there is no major difference between data transfer to the host device 6 from the WC 7 and data transfer to the host device 6 after reading data from the NAND flash 4 to the RC 8.

Therefore, in the present embodiment, the SSD 1 starts reading the entire data of the remaining transfer range from the NAND flash 4 before searching the data in the WC 7. Thereafter, the SSD 1 searches for the remaining transfer range in the WC 7, and as for the data that is found in the WC 7, the SSD 1 transfers the data from the WC 7 to the host device 6, and as for the data that is not present in the WC 7, the SSD 1 transfers the data to the host device 6 from the NAND flash 4 via the RC 8. Thus, data output from the NAND flash 4 can be performed at an early timing, and response to the host device 6 can be quick. Furthermore, because the search process of the WC 7 can be inconspicuously performed with the data output latency of the NAND flash 4, and therefore, data transfer to the host device 6 can be performed at a high speed.

The processing time for data transfer to the host device 6 is the shortest when a processing time for data search of the second part B and a processing time for data transfer of the first part A are equal to each other. Therefore, the SSD 1 can perform data transfer to the host device 6 in such a manner that the processing time for data search of the second part B is equal to the processing time for data transfer of the first part A. In this case, the read control unit 10 sets the first part A and the second part B such that the processing time for data search of the second part B and the processing time for data transfer of the first part A are equal to each other.

Although in the present embodiment, the case that the requested transfer range X is divided into two parts of the first part A and the second part B, the read control unit 10 can divide the requested transfer range X into three or more data ranges. For example, the read control unit 10 divides the requested transfer range X into data ranges of a first line to an nth line (where n is a positive integer equal to or larger than 3). In this case, the read control unit 10 starts a data search process of the second line after data transfer of the first line is started.

The SSD 1 according to the present embodiment can be configured to prefetch a predetermined size of data in a logical address range subsequent to a logical address range for which read request is issued in the RC 8. In this case, the data prefetched according to the previous read request is already been stored in the RC 8 at the time of receiving a new read request. Thus, the access performance can be improved for a read request having sequentiality. Furthermore, as a prefetch method, various methods such as those described in U.S. patent application Ser. No. 11/717,072 and U.S. patent application Ser. No. 12/394,692 can be applied to the present embodiment.

As described above, according to the present embodiment, because the data search process of the second part B is started after data transfer of the first part A to the host device 6 is started, the data transfer to the host device 6 can be started at an early timing, and as a result, data read can be performed at a high speed.

Furthermore, because reading of data that is not present in the RC 8 from the NAND flash 4 is started before searching for the data in the WC 7, reading of data from the NAND flash 4 to the RC 8 can be performed at an early timing. Therefore, even when data for which read request has been issued is present only in the NAND flash 4, data read can be performed at a high speed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A memory system comprising:
a nonvolatile memory capable of storing data;
a read cache provided for the nonvolatile memory, the read cache having smaller data output latency than the nonvolatile memory; and
a controller configured to:
receive, from a host device, a read request designating an address range to be transferred to the host device, the address range being specified by a start logical address and transfer size to be transferred;
divide the address range designated by the read request into a first address range and a second address range, the second address range following the first address range;
search for first data designated by the read request from a top portion of the first address range in the read cache;
start, when the first data has been found from the top portion of the first address range, a first data transfer from the read cache to the host device;
determine whether a first size is equal to a second size, the first size being a size of the first data, the second size being a size of the first address range;
search, when the first size is equal to the second size, for second data designated by the read request from a top portion of the second address range in the read cache, after starting the first data transfer;
start, when the second data has been found from the top portion of the second address range, a second data transfer from the read cache to the host device; and
read out, based on all of third data not being found in the read cache, all of fourth data from the nonvolatile memory to the read cache, the all of third data corresponding to the first address range, the all of fourth data corresponding to the second address range, wherein
the first address range includes successive logical addresses beginning from, the start logical address, and
the second address range includes successive logical addresses, a first of which follows from a last logical address in the first address range.

2. The memory system according to claim 1, wherein the controller is configured to start the second data transfer after completing the first data transfer.

3. The memory system according to claim 1, wherein the controller is configured to readout read out, when the first data has not been found, all of fifth data from the nonvolatile memory to the read cache, the all of fifth data corresponding to the address range designated by the read request.

4. The memory system according to claim 1, wherein the controller is configured to read out, when the second data has not been found from the top portion of the second address range, the all of fourth data from the nonvolatile memory to the read cache, the all of fourth data corresponding to the second address range.

5. The memory system according to claim 1, further comprising:
a write cache provided for the nonvolatile memory, the write cache having smaller data output latency than the nonvolatile memory, wherein the controller is configured to search, after starting the readout from the nonvolatile memory, for data designated by the read request from the write cache.

6. The memory system according to claim 1, further comprising:
a write cache provided for the nonvolatile memory, the write cache having smaller data output latency than the nonvolatile memory, wherein
when data designated by the read request has been found in both of the write cache and read cache, data stored in the write cache is transferred to the host device.

7. The memory system according to claim 1, wherein the controller is configured to set the first address range and the second address range in such a manner that a processing time required for transfer of data that corresponds to the first address range to the host device and a processing time required for search for data that corresponds to the second address range are equal to each other.

8. The memory system according to claim 1, further comprising:
a write cache provided for the nonvolatile memory, the write cache having smaller data output latency than the nonvolatile memory, wherein
the write cache and read cache are configured by dividing a memory area in an identical volatile memory.

9. The memory system according to claim 1, an address translation table by which logical addresses provided from the host device are translated to physical addresses, said controller is configured to use said address translation table to search data.

10. The memory system according to claim 1, wherein searching for data designated by the read request in the memory system and transferring data to the host device are executed in parallel.

11. A method of controlling a memory system comprising:
storing data in a nonvolatile memory;
storing data in a read cache provided for the nonvolatile memory, the read cache having smaller data output latency than the nonvolatile memory;
receiving, from a host device, a read request designating an address range to be transferred to the host device, the address range being specified by a start logical address and transfer size to be transferred;
dividing the address range designated by the read request into a first address range and a second address range, the second address range following the first address range;
searching for first data designated by the read request from a top portion of the first address range in the read cache;
starting, when the first data has been found from the top portion of the first address range, a first data transfer from the read cache to the host device;
determining whether a first size of the first data is equal to a second size of the first address range;
searching, when the first size is equal to the second size, for second data designated by the read request from a top portion of the second address range in the read cache, after starting the first data transfer;
starting, when the second data has been found from the top portion of the second address range, a second data transfer from the read cache to the host device; and
reading out, based on all of third data not being found in the read cache, all of fourth data from the nonvolatile memory to the read cache, the all of third data corresponding to the first address range, the all of fourth data corresponding to the second address range, wherein
the first address range includes successive logical addresses beginning from the start logical address, and
the second address range includes successive logical addresses, a first of which follows from a last logical address in the first address range.

12. The method according to claim 11, wherein the second data transfer is started after completing the first data transfer.

13. The method according to claim 11, wherein when the first data has not been found, reading out of all of fifth data from the nonvolatile memory to the read cache is executed, the all of fifth data corresponding to the address range designated by the read request.

14. The method according to claim 11, wherein, when the second data has not been found from the top portion of the second address range, the reading out of the all of fourth data from the nonvolatile memory to the read cache is executed, the all of fourth data corresponding to the second address range.

15. The method according to claim 11, further comprising:
storing data in a write cache provided for the nonvolatile memory, the write cache having smaller data output latency than the nonvolatile memory; and
searching, after starting the readout from the nonvolatile memory, for data designated by the read request from the write cache.

16. The method according to claim 11, further comprising:
storing data in a write cache provided for the nonvolatile memory, the write cache having smaller data output latency than the nonvolatile memory, wherein
when data designated by the read request has been found in both of the write cache and read cache, data stored in the write cache is transferred to the host device.

17. The method according to claim 11, further comprising:
setting the first address range and the second address range such that a processing time required to transfer data that corresponds to the first address range to the host device and a processing time required to search for data that corresponds to the second address range are equal to each other.

18. The method according to claim 11, further comprising:
storing data in a write cache provided for the nonvolatile memory, the write cache having smaller data output latency than the nonvolatile memory, wherein the write cache and read cache are configured by dividing a memory area in an identical volatile memory.

19. The method according to claim 11, comprising:
executing the searching for data using an address translation table which translates logical addresses provided from the host device to physical addresses.

20. The method according to claim 11, comprising:
executing in parallel searching for data designated by the read request in the memory system and transferring data to the host device.

* * * * *